(12) United States Patent
Morina et al.

(10) Patent No.: US 11,535,236 B2
(45) Date of Patent: Dec. 27, 2022

(54) METHOD OF CONTROLLING A HYBRID PROPULSION SYSTEM OF A VEHICLE

(71) Applicants: C.R.F. Società Consortile per Azioni, Orbassano (IT); Schaeffler Technologies AG & Co. KG, Herzogenaurach (DE)

(72) Inventors: Dario Morina, Orbassano (IT); Simone Martina, Orbassano (IT); Dario Del Pin, Orbassano (IT); Emanuel Corigliano, Orbassano (IT); Timo Kersting, Meschede (DE); Johannes Gimpl, Neumarkt (DE)

(73) Assignees: C.R.F. Società Consortile per Azioni, Orbassano (IT); Schaeffler Technologies AG & Co. KG, Herzogenaurach (DE)

( * ) Notice: Subject to any disclaimer, the term of this patent is extended or adjusted under 35 U.S.C. 154(b) by 168 days.

(21) Appl. No.: 16/923,241

(22) Filed: Jul. 8, 2020

(65) Prior Publication Data
US 2021/0009105 A1    Jan. 14, 2021

(30) Foreign Application Priority Data
Jul. 10, 2019   (EP) .................................... 19185421

(51) Int. Cl.
*B60W 20/00*    (2016.01)
*B60W 20/15*    (2016.01)
(Continued)

(52) U.S. Cl.
CPC ............ *B60W 20/15* (2016.01); *B60W 10/02* (2013.01); *B60W 10/06* (2013.01); *B60W 10/08* (2013.01);
(Continued)

(58) Field of Classification Search
CPC ... B60K 2006/268; B60K 6/48; B60W 10/06; B60W 10/02; B60W 10/08; B60W 10/10;
(Continued)

(56) References Cited

U.S. PATENT DOCUMENTS

| 6,655,485 | B1* | 12/2003 | Ito ......................... | B60K 6/387 |
| | | | | 903/910 |
| 2007/0080005 | A1* | 4/2007 | Joe .......................... | B60K 6/48 |
| | | | | 180/65.245 |
| 2008/0119975 | A1* | 5/2008 | Yamazaki .............. | B60W 20/11 |
| | | | | 701/22 |
| 2014/0379184 | A1* | 12/2014 | Kim ...................... | F02N 15/022 |
| | | | | 180/65.265 |
| 2015/0344019 | A1 | 12/2015 | Matsui et al. | |

FOREIGN PATENT DOCUMENTS

DE          10353256 B3     3/2005
DE      102004023673 A1    12/2005
(Continued)

OTHER PUBLICATIONS

European Search Report dated Oct. 18, 2019. 5 pages.

*Primary Examiner* — Gonzalo Laguarda
(74) *Attorney, Agent, or Firm* — RMCK Law Group PLC

(57) ABSTRACT

A method of controlling a vehicle hybrid propulsion system is provided. The propulsion system includes an internal combustion engine, first and second clutches, an electric motor, and a gearbox having an input shaft and an output shaft connected to drive wheels. The method includes a first operating mode of starting the engine by the motor, a second operating mode of actuating a gear shift, and a third operating mode which actuates starting of the engine and the gear shift. The method includes passing from the first to the third operating modes even if starting of the engine has not been completed, or passing from the second to the third operating modes even if actuation of the gear shift has not been completed, so that the transition from one operating mode to another can be freely actuated at any time, depending upon operating conditions of the hybrid propulsion system.

9 Claims, 5 Drawing Sheets

(51) Int. Cl.
*B60W 10/02* (2006.01)
*B60W 10/06* (2006.01)
*B60W 10/08* (2006.01)
*B60W 10/10* (2012.01)
*B60W 20/30* (2016.01)
*B60W 20/40* (2016.01)
*F02N 11/00* (2006.01)

(52) U.S. Cl.
CPC ............ *B60W 10/10* (2013.01); *B60W 20/30* (2013.01); *B60W 20/40* (2013.01); *F02N 11/00* (2013.01); *B60W 2520/10* (2013.01); *B60W 2540/10* (2013.01)

(58) Field of Classification Search
CPC ...... B60W 20/15; B60W 20/30; B60W 20/40; B60W 2520/10; B60W 2540/10; F02N 11/00
See application file for complete search history.

(56) References Cited

FOREIGN PATENT DOCUMENTS

| | | |
|---|---|---|
| DE | 102006018059 A1 | 10/2007 |
| DE | 102006031684 A1 | 1/2008 |
| DE | 102007049137 A1 | 4/2009 |
| DE | 102009001575 A1 | 9/2010 |
| DE | 102011079079 A1 | 1/2013 |
| DE | 112011104940 T5 | 1/2014 |
| DE | 102012220478 A1 | 5/2014 |
| DE | 102013200825 A1 | 7/2014 |
| DE | 102016203260 A1 | 8/2017 |
| EP | 1177930 B1 | 4/2007 |
| EP | 2772398 A1 | 9/2014 |
| GB | 2413998 A | 11/2005 |
| JP | 2010149640 A | 7/2010 |

\* cited by examiner

METHOD OF CONTROLLING A HYBRID PROPULSION SYSTEM OF A VEHICLE

CROSS-REFERENCE TO RELATED APPLICATION

This application claims priority to European Patent Application No. 19185421.5 filed Jul. 10, 2019. The disclosure of the above application is incorporated herein by reference in its entirety.

FIELD OF THE INVENTION

The present invention relates to a method of controlling a hybrid propulsion system of a vehicle, wherein the hybrid propulsion system includes an in-series arrangement including an internal combustion engine, a first clutch, an electric motor, a second clutch and a gearbox having an input shaft and an output shaft connected to the drive wheels of the vehicle. The first clutch is arranged between the internal combustion engine and the electric motor, and the second clutch is arranged between the electric motor and the input shaft of the gearbox.

PRIOR ART

A hybrid propulsion system of this type may be in an initial operating state wherein the internal combustion engine is turned off, the electric motor is active and the first clutch is in an open condition, so that connection between the internal combustion engine and the electric motor is interrupted. Starting from this operating state, control methods are known which include:
- a first operating mode of starting the internal combustion engine by means of the electric motor, wherein the first clutch is progressively closed, so that the internal combustion engine is driven in rotation by the electric motor, while the second clutch is set in a slip condition, so that the electric motor provides a torque higher than the torque transmitted to the input shaft of the gearbox, and
- a second operating mode of actuating a gear shift, wherein the gearbox actuates a variation of the transmission ratio between the input shaft and the output shaft.

In these known methods, the first operating mode includes starting the internal combustion engine excluding actuation of the gearbox until start of the internal combustion engine is completed, and the second operating mode includes actuating a gear shift excluding start of the internal combustion engine until actuation of the gear shift is completed.

Methods as described above are known, for instance, from documents EP 1 177 930 B1, DE 10 2016 203260 A1, DE 103 53256 B3, DE 10 2006 018059 A1, DE 10 2012 220478 A1, DE 11 2011 104940 T5, JP 2010-149640 A.

Such known methods provide a way of managing sequentially a start of the internal combustion engine and a gear shift. For instance, a kick down situation (i.e., a sudden pressure on the accelerator pedal, as may be requested during an overtake) during electric drive mode may lead to a request for a gear shift (e.g., a downshift) and a request for an engine start at the same time, with these two requests being managed sequentially.

In some situations, a request for simultaneous actuation of both an engine start and a gear shift may result in significant delays within the powertrain dynamics, if such operations are performed sequentially (e.g., the engine start is temporarily paused to operate the gear shift, or the gear shift is temporarily paused to operate the engine start).

For this reason, methods have been also proposed which include a third operating mode, which actuates a start of the internal combustion engine and a gear shift in parallel. This third operating mode is disclosed, for instance, in DE 10 2013 200825 A1, DE 10 2006 031684 A1, DE 10 2011 079079 A1, DE 10 2004 023673 A1.

In all these known methods the strategy to be implemented must be decided right at the start of a given sequence of operations. However, since the driver requirements cannot be predicted before a sequence start, it is not always possible to determine an independent strategy to decide the drive mode and the gear ratio beforehand. The strategies currently at hand determine, at a given point in time, a specific sequence to be implemented and they let it run without paying heed to possible changes in requirements.

OBJECT OF THE INVENTION

The object of the present invention is to provide a method which solves the above-mentioned drawback of the prior art, by providing better flexibility with respect to the parallelisation of the engine start and the gear shift in hybrid powertrain systems of the above indicated type.

Another object of the invention is to provide a more pleasant driving feeling for the driver of the vehicle by increasing the responsiveness of the vehicle to the driver's inputs (e.g., an acceleration request).

Another object of the invention is in general to improve the performance of the hybrid propulsion system.

SUMMARY OF THE INVENTION

In view of achieving this object, the present invention relates to a method having the features of claim 1.

As opposed to the above discussed methods of the prior art, by the present invention it is possible to switch to a different one of said first, second and third operating modes from a previous operating mode, even after that the previous operating mode has already started. Hence, it is also possible for instance to parallelise the engine start in specific phases during a current gear shift operation. Vice versa, it is also possible to start a gear shift operation while an engine start is already in progress.

Thanks to the invention, it is thus possible to react dynamically on the recommendations of both the strategies (engine start and gear shift) without the prior knowledge of the requisite operations to be performed. This helps avoiding superfluous gear shifts and engine starts, or temporarily suppressing any of these strategies due to the other.

In the method of the invention, based on the analysis of the current state of the powertrain, the system is optimally controlled so as to implement the recommendations of the chosen strategy at the earliest, which also improves the efficiency and the performance of the vehicle.

In a preferred embodiment, the first operating mode is activated when the value of torque requested by a driver of the vehicle reaches a predetermined threshold value, the predetermined threshold value being lower than the value of maximum torque deliverable by the electric motor, for each value of the rotational speed of the electric motor.

In a variant of said preferred embodiment, the predetermined threshold value is given by a map as a function of the rotational speed of the electric motor.

In a preferred embodiment, the second operating mode is activated as a function of the vehicle speed and the position of the accelerator pedal.

In a variant of said preferred embodiment, a value of the power requested by the driver of the vehicle is determined as a function of the vehicle speed and of the position of the accelerator pedal, and subsequently an operating point of the gearbox is determined as a function of the determined value of the power requested by the driver of the vehicle and of the vehicle speed. As an alternative, the operating points of the gearbox can be determined as a function of engine power and/or engine torque.

In a preferred embodiment, when the third operating mode is selected to actuate in parallel a start of the internal combustion engine and a gear shift towards a lower gear (e.g., a power-on downshift), the following steps are taken:
- in a first phase of the third operating mode, the second clutch, which is arranged between the electric motor and the gearbox, is set in a slip condition, so that the electric motor rotates at a speed higher than the rotational speed of the input shaft before the gear shift,
- in a second phase of the third operating mode, the first clutch is progressively closed so that the internal combustion engine starts to be driven in rotation by the electric motor, while the second clutch is kept in a slip condition so that the rotational speed of the electric motor is higher than a minimum rotational speed which allows operation of the internal combustion engine, and the slip condition of the second clutch is kept until the internal combustion engine and the electric motor rotate substantially at a same speed which is higher than the rotational speed of the input shaft before the gear shift, and which is progressively increased to the value of rotational speed of the input shaft after the gear shift.

In the preferred embodiment, when the third operating mode is selected to actuate in parallel a start of the internal combustion engine and a gear shift towards a higher gear (e.g., a power-on upshift), the following steps are taken:
- in a first phase of the third operating mode, the second clutch, which is arranged between the electric motor and the gearbox, is set in a slip condition, so that the electric motor rotates at a speed lower than the rotational speed of the input shaft before the gear shift,
- in a second phase of the third operating mode, the first clutch is progressively closed so that the internal combustion engine starts to be driven in rotation by the electric motor, while the second clutch is kept in a slip condition so that the rotational speed of the electric motor is higher than a minimum rotational speed which allows operation of the internal combustion engine, and the slip condition of the second clutch is kept until the internal combustion engine and the electric motor rotate substantially at a same speed which is lower than the rotational speed of the input shaft before the gear shift, ad which is progressively decreased to the value of rotational speed of the input shaft after the gear shift.

In a preferred embodiment, the gearbox comprises a first input shaft and a second input shaft, and between the electric motor and the gearbox there are interposed two clutches respectively associated to the first input shaft and to the second input shaft. In this case, each gear shift is actuated by opening one of the two clutches associated to the two input shafts and closing the other of the two clutches, and start of the internal combustion engine is actuated by setting in a slip condition the one of the two clutches which is initially in a closed condition.

One or more embodiments may relate to a hybrid propulsion system for a vehicle, comprising at least one electronic control unit of the hybrid propulsion system configured for actuating the method of one or more embodiments.

One or more embodiments may relate to a corresponding vehicle comprising such a hybrid propulsion system.

BRIEF DESCRIPTION OF THE DRAWINGS

Further characteristics and advantages of the invention will become apparent from the description that follows, with reference to the attached drawings, provided purely by way of non-limiting example, wherein.

DETAILED DESCRIPTION OF SOME EMBODIMENTS

Figure 1:
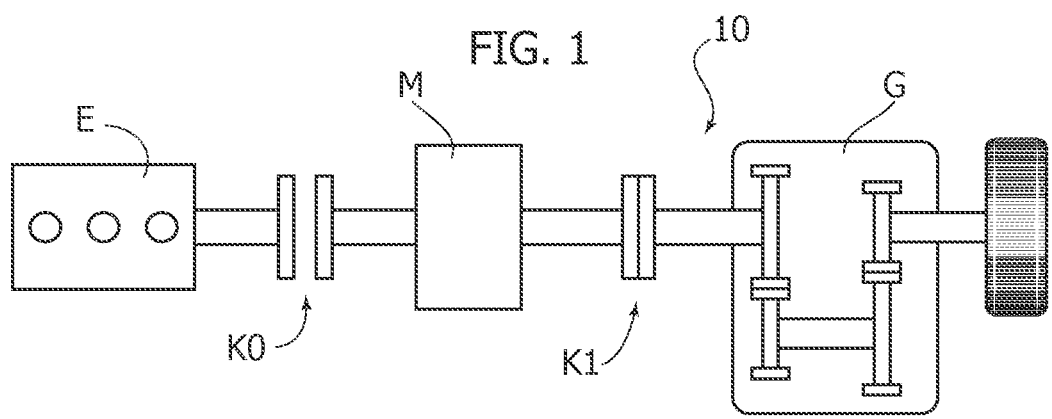
FIGS. 1 to 4 are schematic views of a hybrid propulsion system suitable for use in one or more embodiments.

In FIG. 1, the reference number 10 indicates in its entirety a hybrid propulsion system suitable for use in one or more embodiments. The hybrid propulsion system 10 comprises an in-series arrangement of: an internal combustion engine E, a first clutch K0, an electric motor M, a second clutch K1, and a gearbox G (the same references also apply to the following Figures). The gearbox G has an input shaft and an output shaft connected to the drive wheels of the vehicle. The first clutch K0 is arranged between the engine E and the motor M, and the second clutch K1 is arranged between the motor M and the input shaft of the gearbox G.

FIGS. 1 to 4 illustrate schematically the hybrid propulsion system 10 during four successive phases of an engine start procedure.

In FIG. 1, the first clutch K0 is open and the second clutch is closed, so that the drive wheels of the vehicle are driven by the electric motor M through the gearbox G and the vehicle can be set in motion in a purely electric drive mode upon activation of the electric motor M.

Figure 2:
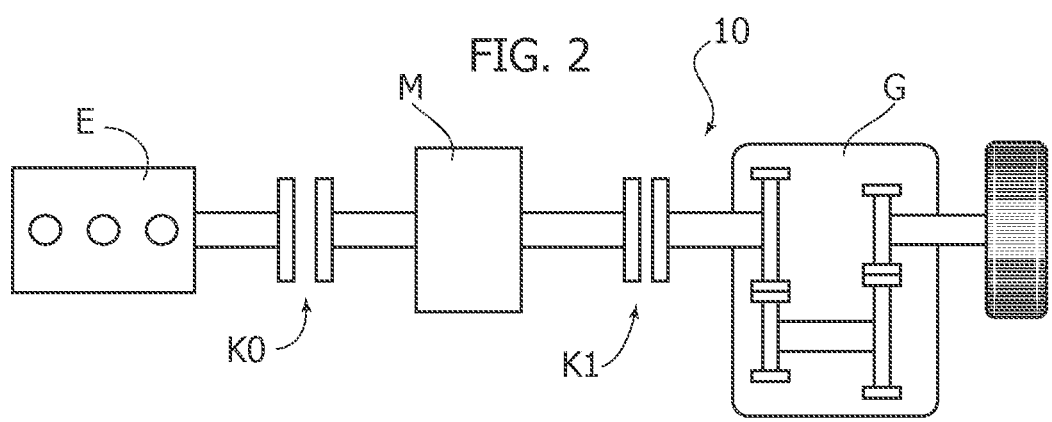

In FIG. 2, the second clutch K1 is partially open, i.e., it is in a slip condition which allows the output shaft of the electric motor M to rotate at a higher speed than the input shaft of the gearbox G. In this condition, only a part of the torque deliverable by the electric motor M is transmitted to the drive wheels of the vehicle through the gearbox G. The excess torque deliverable by the electric motor M may be advantageously used for starting the internal combustion engine E.

Figure 3:
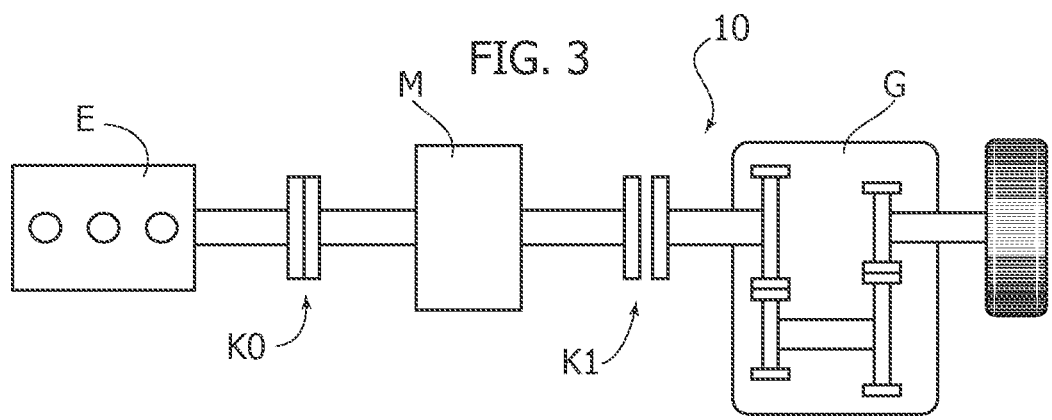

In FIG. 3, the second clutch K1 is still in a slip condition, while the first clutch K0 has been closed (totally or partially) in order to transmit torque from the electric motor M to the engine E and drive into rotation the engine E. In this phase, the electric motor M may operate as a "starter" motor for the engine E.

Figure 4:
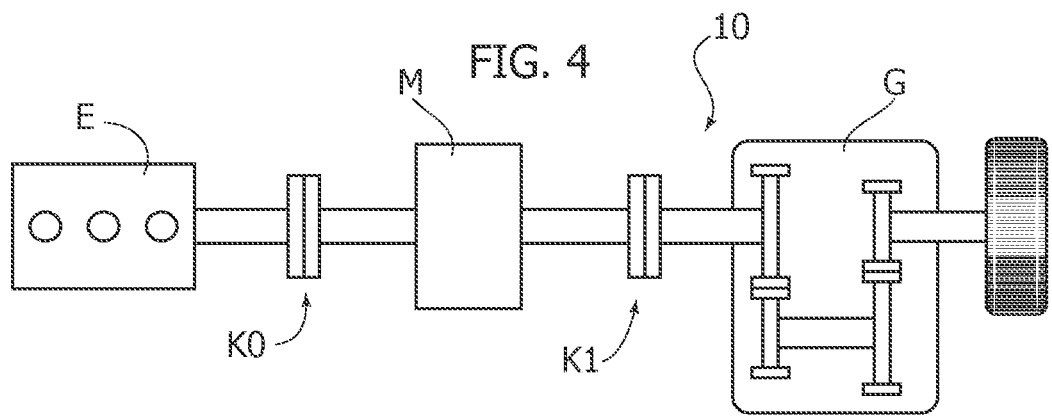

Once the engine E has been successfully started, the second clutch K1 may be closed again as illustrated in FIG. 4, so that the drive wheels of the vehicle are driven by the in-series arrangement of both the internal combustion engine E and the electric motor M.

In the example illustrated herein, the second clutch K1 is closed initially (i.e., before the engine start is performed). Alternatively, the second clutch K1 may be initially open.

Figure 5:
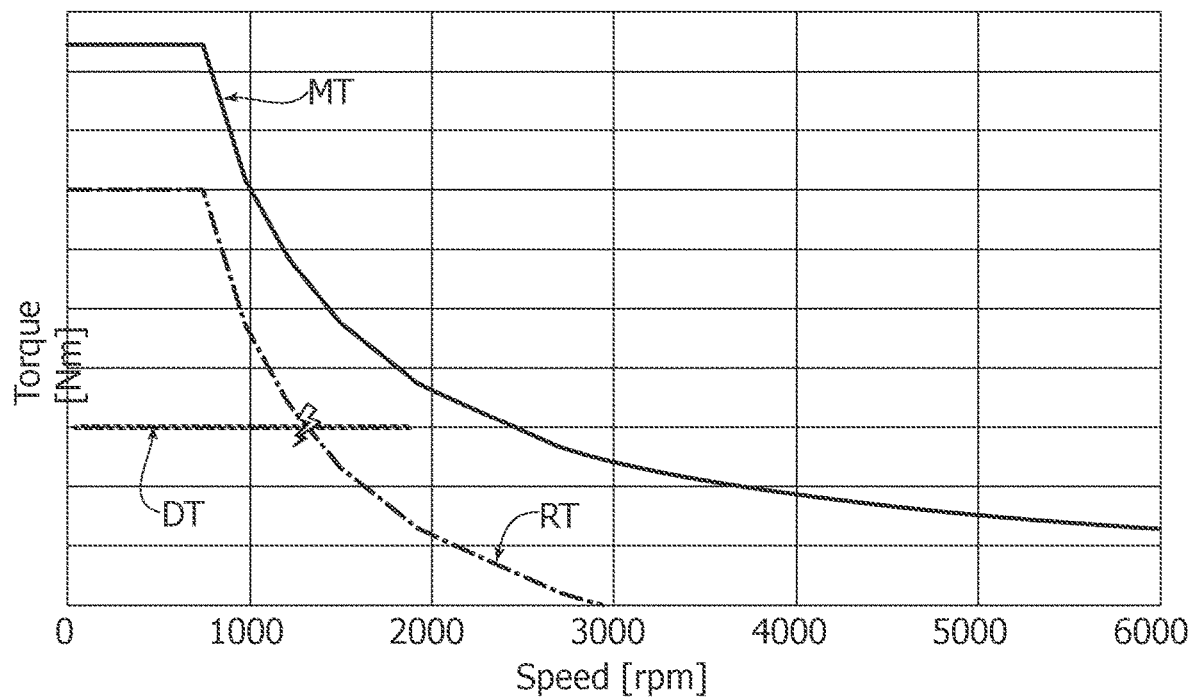
FIG. 5 is a diagram illustrating the torque deliverable by an electric motor in one or more embodiments.

FIG. 5 is a diagram schematically illustrating the torque (in Nm) deliverable by an electric motor M as a function of its rotational speed (in rpm). In particular, the solid line MT is indicative of the total torque deliverable by the motor M, while the dash-and-dot line RT is indicative of the maximum torque deliverable by the motor M which may be used for wheel traction. The difference can be used for restarting the engine E. A strategy for triggering the start of the internal combustion engine E, i.e. a strategy as possibly implemented in the first operating mode of the method according to the invention, may comprise triggering the start of the internal combustion engine E when the torque DT requested by the driver of the vehicle (exemplified, for instance, by the dotted line in FIG. 5) exceeds the torque RT provided by the electric motor to the wheels. Thus, the first operating mode of the method according to the invention may be activated when the value of torque requested by a driver of the vehicle reaches a predetermined threshold value, with the predetermined threshold value being lower than the value of maximum torque deliverable by the electric motor M, for each value of the rotational speed of the electric motor M. The predetermined threshold value may thus be given by a map as a function of the rotational speed of the electric motor M.

It will be understood that activating the first operating mode as a function of the value of torque requested by the driver of the vehicle is described herein by way of example only. In one or more embodiments, activation of the first operating mode (i.e., actuation of an engine start) may be triggered depending on different and/or additional inputs, e.g., as a function of other operating conditions of the hybrid propulsion system.

Figure 6:
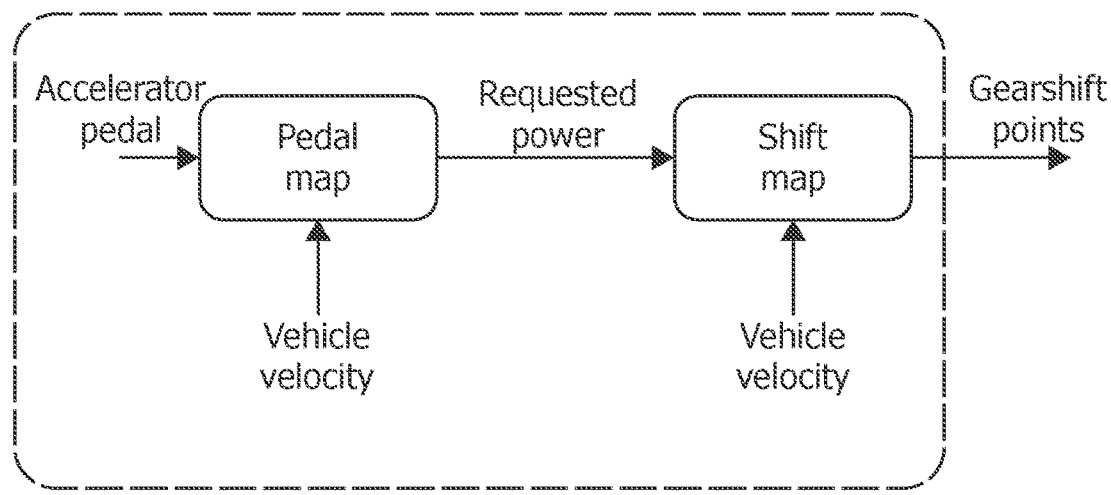
FIG. 6 is a block diagram of a procedure for calculating operating points of a gearbox.

FIG. 6 is a block diagram of a method of calculating operating points of a gearbox, with such operating points being possibly used in a second operating mode of the method according to the invention, wherein the gearbox actuates a variation of the transmission ratio between the at least one input shaft and the output shaft of the gearbox G.

Calculating the operating points of the gearbox G may comprise, as a first step, using a "pedal map" which determines the actual power requested by the driver as a function of the current vehicle speed and current position of the accelerator pedal.

In a first implementation, the pedal map may comprise a 2D-table which associates, to certain pairs of values <pedal position; vehicle speed>, a corresponding value of power requested by the driver.

In another implementation, the pedal map may comprise a two-variable function which computes the requested power for any pair of values <pedal position; vehicle speed>.

The pedal position may be expressed, for instance, as a percentage with respect to the fully-pressed position, e.g., with 0% indicating that the accelerator pedal is fully released, and 100% indicating that the accelerator pedal is fully pressed. The vehicle velocity may be expressed in km/h.

A pedal map may be calibrated depending on the characteristics of the propulsion system (e.g., sizing of the engine E, of the motor M) and/or of the vehicle where the propulsion system is installed (e.g., weight of the vehicle).

A pedal map as described herein may be calibrated so that, at a low vehicle speed (e.g., up to 20 km/h), the propulsion system provides a constant torque (i.e., increasing power at increasing speed), while at higher vehicle speed (e.g., higher than 20 km/h) the propulsion system provides a constant power (i.e., decreasing torque at increasing speed).

As an alternative, the operating points of the gearbox can be determined as a function of engine power and/or engine torque.

As a second step, calculating the operating points of the gearbox G may comprise using a shift map which determines the possible "gearshift points" as a function of the current vehicle speed and current power requested by the driver, as calculated by means of the pedal map, or alternatively as a function of engine power and/or engine torque. The shift map may comprise a two-variable function which associates, to any pair of values <requested power; vehicle speed>, a corresponding value of a gear (e.g., from 1 to 6, or from 1 to 9, or others depending on the number of gears provided in the gearbox G) which has to be used in that operating condition of the vehicle. The shift map may possibly take into account also additional parameters such as the engine load, the road slope, the brake pedal being pressed or not, etc.

Therefore, by plotting a shift map on a plane wherein the X axis is the vehicle speed and the Y axis is the requested power, a certain set of "fields" may be identified. Each field may correspond to a set of pairs of values <requested power; vehicle speed> which are mapped to the same gear by the shift map. Boundaries between different fields thus correspond to all possible gearshift points, i.e., the pairs of values <requested power; vehicle speed> which would trigger a gear shift according to the second operating mode of the method according to the invention. In each shift map, the number of such boundaries is equal to the number of gears in the gearbox G, minus one.

Different shift maps may be computed for up-shift and down-shift operations, as well as depending on the value(s) of additional parameter(s) such as the above-mentioned engine load, road slope, brake pedal pressure, etc. Different shift maps may also be computed for different driving modalities of the vehicle (e.g., normal mode, dynamic mode, sport mode, all weather mode, etc.)

Therefore, it has been shown that a hybrid propulsion system may operate according to a certain first strategy (see FIG. 5) for selecting the current driving mode (i.e., fully electric or hybrid) thereby determining engine start requests, and according to a certain second strategy (see FIG. 6) for selecting the current gear thereby determining gear shift requests.

Such first and second strategies may thus request actuation of an engine start and actuation of a gear shift, respectively, independently one from the other. In the known methods, in case such requests are issued almost simultaneously, a conflict may arise and the actuations are executed sequentially (i.e., pausing one of the two actuations until the other has been completed).

As already known, a third operating mode can be provided which allows actuating in parallel a start of the internal combustion engine and a gear shift.

In the present invention, the method includes passing from the first operating mode to the third operating mode even if the start of the internal combustion engine has not been yet completed, or passing from the second operating mode to the third operating mode even if the actuation of the gear shift has not been yet completed, so that the transition from one operating mode to another can be freely actuated at any time, depending upon the operating conditions of the hybrid propulsion system.

The diagrams of FIGS. 7-10 refer to an embodiment of the present invention wherein the gearbox G comprises a first input shaft and a second input shaft, and wherein between the electric motor M and the gearbox G there are interposed two clutches K1, K2 respectively associated to the first input shaft and to the second input shaft. In this embodiment, each gear shift is actuated by opening one of the two clutches associated to the two input shafts and closing the other clutch. Start of the internal combustion engine E is actuated by setting in a slip condition at least one of said two clutches. In particular, in case the internal combustion engine E is started during a downshift, said slip condition may pertain to the clutch which is initially closed, and in case the internal combustion engine E is started during an upshift, said slip condition may pertain to the clutch which is initially open.

Figure 7:
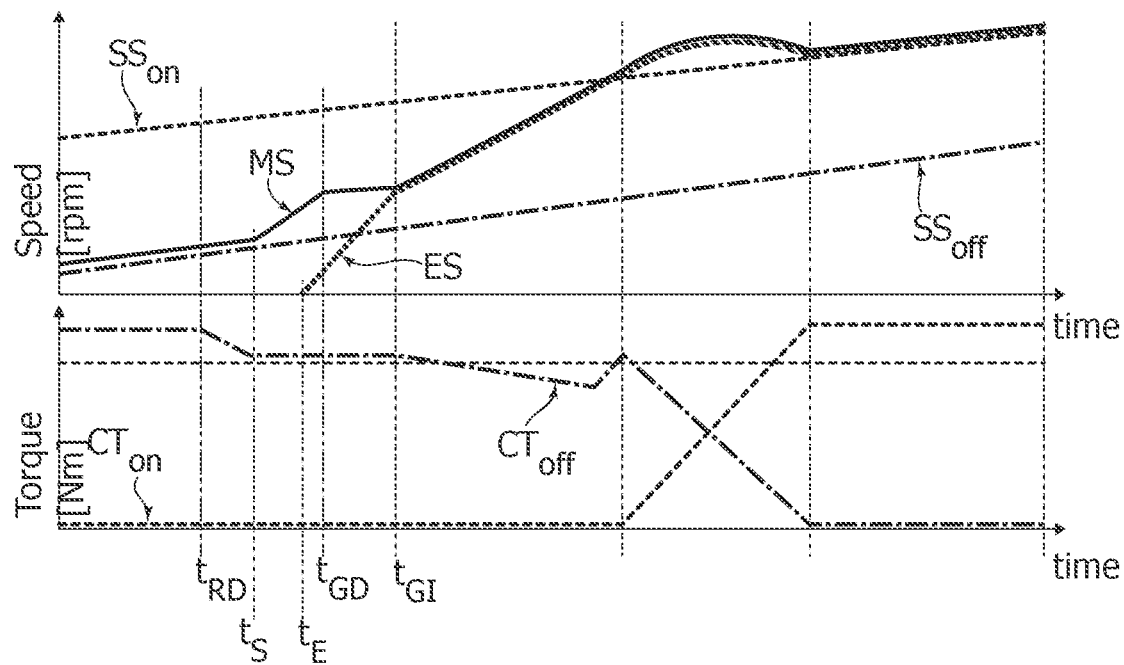
FIGS. 7 to 9 are diagrams showing strategies implemented by the method of the present invention.

The diagram of FIG. 7 illustrates the behavior over time of the following quantities during a parallel actuation of a downshift (e.g., a power-on downshift) and an engine start, wherein the engine start request is issued at a certain instant $t_{RD}$ and the downshift request is issued a certain instant $t_{GD}$, closely following instant $t_{RD}$:

$SS_{on}$ (dash line): on-going input shaft speed,
$SS_{off}$ (dash-and-dot line): off-going input shaft speed,
MS (solid line): electric motor speed,
ES (dot line): internal combustion engine speed,
$CT_{off}$ (dash-and-dot line): off-going input shaft torque, and
$CT_{on}$ (dash line): on-going input shaft torque.

Figure 8:
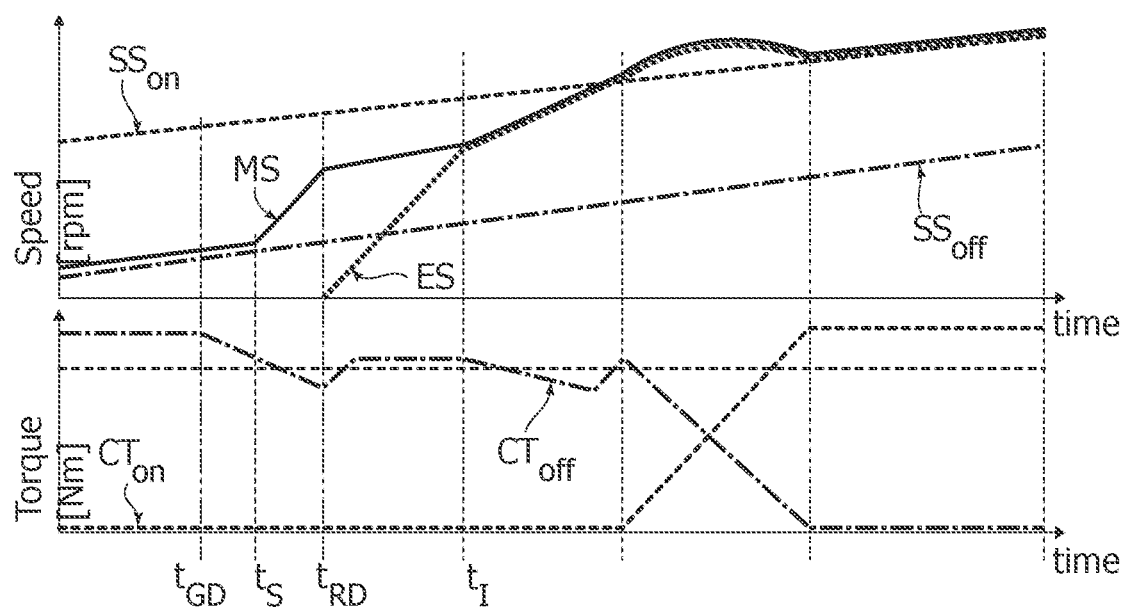

The diagram of FIG. 8 illustrates the same quantities as listed above (with the same legend), in a case wherein the instant $t_{RD}$ closely follows the instant too, also regarding parallel actuation of a downshift (e.g., a power-on downshift) and an engine start.

Therefore, as illustrated in FIGS. 7 and 8, the third operating mode may actuate in parallel a start of the internal combustion engine E and a gear shift towards a lower gear (downshift). As indicated, FIGS. 7 and 8 refer to a case wherein the gearbox G has two input shafts, so that in the initial condition of the propulsion system (until instant $t_S$):

the first clutch K0 is open, with the engine E turned off,
a first input shaft of the gearbox G is connected to the electric motor M by means of a respective second clutch (K1 or K2) which is closed, and
a second input shaft of the gearbox G is disconnected from the electric motor M by means of a respective second clutch (K2 or K1) which is open.

Thus, according to the invention:
in a first phase of the third operating mode (FIG. 7: between $t_S$ and $t_E$; FIG. 8: between $t_S$ and $t_{RD}$), the respective second clutch (K1 or K2) arranged between the electric motor M and the first input shaft of the gearbox G is set in a slip condition, so that the electric motor M rotates at a speed higher than the rotational speed of the first input shaft before the gear shift,
in a second phase of the third operating mode (FIG. 7: between $t_E$ and $t_I$; FIG. 8: between $t_{RD}$ and $t_I$), the first clutch K0 is progressively closed so that the internal combustion engine E starts to be driven in rotation by the electric motor M, while the respective second clutch (K1 or K2) arranged between the electric motor M and the first input shaft of the gearbox G is kept in a slip condition so that the rotational speed of the electric motor M is higher than a minimum rotational speed which allows operation of the internal combustion engine E, and
the slip condition of the respective second clutch (K1 or K2) arranged between the electric motor M and the first input shaft of the gearbox G is kept until the internal combustion engine E and the electric motor M rotate substantially at a same speed (instant $t_I$ in FIGS. 7 and 8) which is higher than the rotational speed of the first input shaft before the gear shift, and which is progressively increased to the value of rotational speed of the second input shaft after the gear shift by progressively opening the second clutch (K1 or K2) arranged between the electric motor M and the first input shaft of the gearbox G and progressively closing the second clutch (K2 or K1, respectively) arranged between the electric motor M and the second input shaft of the gearbox G.

Therefore, in case a gear shift command is issued shortly after an engine start command (see again FIG. 7, instants $t_{RD}$ and too) and before the engine start has been completed, the method according to the invention takes advantage of a slip condition of the second clutch K1 or K2, which is generated by the engine start command, to perform a gear shift in parallel to the engine start.

Conversely, in case an engine start command is issued shortly after a gear shift command (see again FIG. 8, instants $t_{RD}$ and too) and before the gear shift has been completed, the method according to the invention takes advantage of a slip condition of the second clutch K1 or K2, which is generated by the gear shift command, to perform an engine start in parallel to the gear shift.

The method of the invention allows parallelizing operation of a gear shift and an engine start also in case of an upshift.

Figure 9:
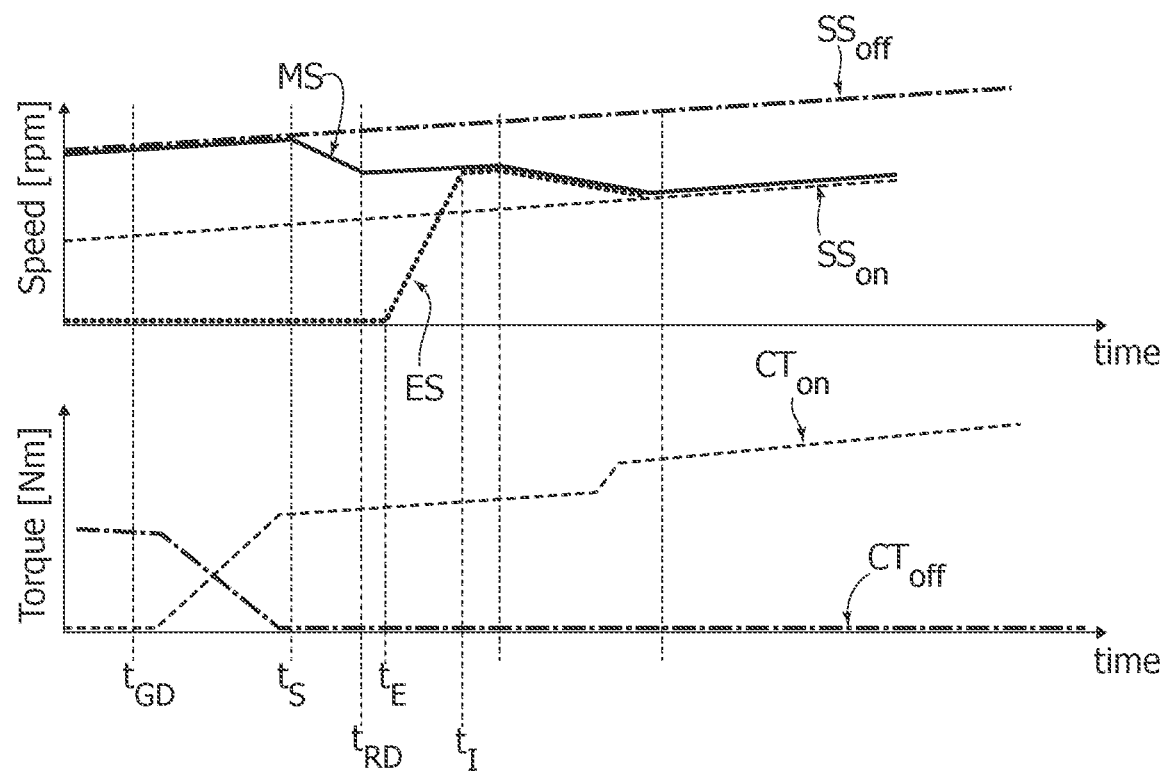
Figure 10:
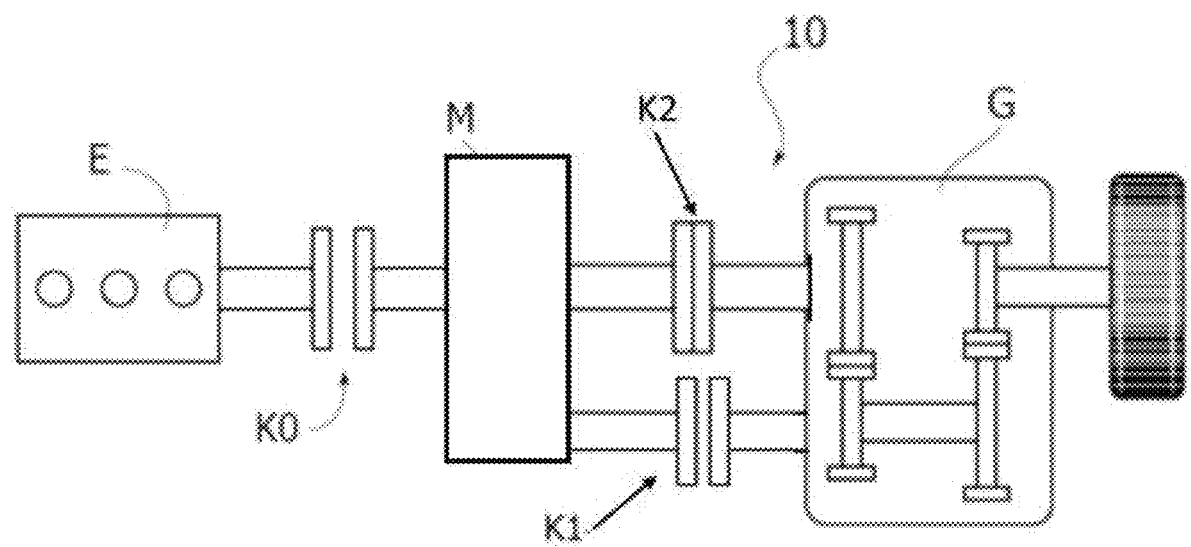
FIG. 10 is a schematic view of a hybrid propulsion system suitable for use in one or more embodiments.

For instance, the diagram of FIG. 9 illustrates the behavior over time of the quantities $SS_{on}$, $SS_{off}$, MS, ES, $CT_{off}$, $CT_{on}$ during a parallel actuation of an upshift (e.g., a power-on upshift) and an engine start, wherein the upshift request is issued a certain instant $t_{GD}$ and the engine start request is issued at a certain instant $t_{RD}$, closely following instant $t_{GD}$.

Therefore, as illustrated in FIG. 9, the third operating mode may actuate in parallel a start of the internal combustion engine E and a gear shift towards an upper gear (upshift). Similarly to FIGS. 7 and 8, also FIG. 9 refers to a case wherein the gearbox G has two input shafts, so that in the initial condition of the propulsion system (until instant $t_S$):

the first clutch K0 is open, with the engine E turned off,
a first input shaft of the gearbox G is connected to the electric motor M by means of a respective second clutch (K1 or K2) which is closed, and
a second input shaft of the gearbox G is disconnected from the electric motor M by means of a respective second clutch (K2 or K1) which is open.

Thus, according to the invention:
in a first phase of the third operating mode (FIG. 9: between $t_S$ and $t_{RD}$), the respective second clutch (K1 or K2) arranged between the electric motor M and the first input shaft of the gearbox G is opened and the respective second clutch (K2 or K1) arranged between the electric motor M and the second input shaft of the gearbox G is set in a slip condition, so that the electric motor M rotates at a speed lower than the rotational speed of the first input shaft before the gear shift,
in a second phase of said third operating mode (FIG. 9: between $t_{RD}$ and $t_I$), the first clutch K0 is progressively closed so that the internal combustion engine E starts to be driven in rotation by the electric motor M, while the second clutch (K2 or K1) arranged between the electric motor M and the second input shaft of the gearbox G is kept in a slip condition so that the rotational speed of the electric motor M is higher than a minimum rotational speed which allows operation of the internal combustion engine, and the slip condition of the second clutch (K2 or K1) arranged between the electric motor M and the second input shaft of the gearbox G is kept until the internal combustion engine E and the electric motor M rotate substantially at a same speed (instant $t_f$ in FIG. 9) which is lower than the rotational speed of the first input shaft before the gear shift, and which is progressively decreased to the value of rotational speed of the second input shaft after the gear shift by progressively closing the second clutch (K2 or K1) arranged between the electric motor M and the second input shaft of the gearbox G.

Thus, the method according to the invention allows controlling the propulsion system to react to any of a gear shift request or an engine start request, even if such request is issued shortly after another request (an engine start request or a gear shift request, respectively) and independently therefrom. This is achieved by exploiting the fact that a slip condition of the second clutch may be already present when the latter of the two requests is issued.

Of course, without prejudice to the principle of the invention, the details of construction and the embodiments may vary widely with respect to those described and illustrated here purely by way of example, without departing from the scope of the present invention, as defined by the attached claims.

What is claimed is:

1. A method of controlling a hybrid propulsion system of a vehicle, wherein the hybrid propulsion system includes an in-series arrangement having an internal combustion engine, a first clutch, an electric motor, a second clutch and a gearbox having a first input shaft and an output shaft connected to drive wheels of the vehicle, said first clutch being arranged between the internal combustion engine and the electric motor, and said second clutch being arranged between the electric motor and said first input shaft of the gearbox, wherein said hybrid propulsion system is in an initial operating state where the internal combustion engine is turned off, the electric motor is active and said first clutch is in an open condition, whereby connection between the internal combustion engine and the electric motor is interrupted, the method comprising:

said gearbox including a second input shaft and said hybrid propulsion system including a third clutch arranged between the electric motor and the second input shaft, a first operating mode of starting the internal combustion engine by the electric motor excluding actuation of a gear shift of the gearbox until start of the internal combustion engine is completed, wherein said first clutch is progressively closed, so that the internal combustion engine is driven in rotation by the electric motor, while at least one of the second and third clutches is set in a slip condition, so that the electric motor provides a torque higher than any torque transmitted to at least one of said corresponding first and second input shafts, a second operating mode of actuating the gear shift excluding start of the internal combustion engine until actuation of the gear shift is completed, wherein each gear shift is actuated by opening one of the second and third clutches and closing the other of the second and third clutches, and wherein said gearbox actuates a variation of a transmission ratio between said input shaft and said output shaft, a third operating mode which actuates in parallel the start of the internal combustion engine and the gear shift, passing from the first operating mode to the third operating mode even if the start of the internal combustion engine has not been yet completed, or passing from the second operating mode to the third operating mode even if the actuation of the gear shift has not been yet completed, so that the transition from one operating mode to another can be freely actuated at any time, depending upon the operating conditions of the hybrid propulsion system.

2. The method of claim 1, wherein said first operating mode is activated when a value of torque requested by a driver of the vehicle reaches a predetermined threshold value, said predetermined threshold value being lower than a value of maximum torque deliverable by the electric motor, for each value of a rotational speed of the electric motor.

3. The method of claim 2, wherein said predetermined threshold value is given by a map as a function of the rotational speed of the electric motor.

4. The method of claim 1, wherein said second operating mode is activated as a function of a speed of the vehicle and a position of an accelerator pedal of the vehicle.

5. The method of claim 4, wherein a value of a power requested by a driver of the vehicle is determined as a function of the vehicle speed and of the position of the accelerator pedal, and subsequently an operating point of the gearbox is determined as a function of the determined value of the power requested by the driver of the vehicle and of the vehicle speed.

6. The method of claim 1, wherein said third operating mode actuates in parallel the start of the internal combustion engine and the gear shift towards a lower gear, wherein:

in a first phase of said third operating mode, said second clutch, which is arranged between the electric motor and the gearbox, is set in a slip condition, so that the electric motor rotates at a speed higher than a rotational speed of said input shaft before the gear shift, in a second phase of said third operating mode, said first clutch is progressively closed so that the internal combustion engine starts to be driven in rotation by the electric motor, while said second clutch is kept in a slip condition so that a rotational speed of the electric motor is higher than a minimum rotational speed which allows operation of the internal combustion engine, and said slip condition of the second clutch is kept until the internal combustion engine and the electric motor rotate substantially at a same speed which is higher than the rotational speed of said input shaft before the gear shift, and which is progressively increased to a value of rotational speed of said input shaft after the gear shift.

7. The method of claim 1, wherein said third operating mode actuates in parallel the start of the internal combustion engine and the gear shift towards a higher gear, wherein:

in a first phase of said third operating mode, said second clutch, which is arranged between the electric motor and the gearbox, is set in a slip condition, so that the electric motor rotates at a speed lower than a rotational speed of said input shaft before the gear shift, in a second phase of said third operating mode, said first clutch is progressively closed so that the internal combustion engine starts to be driven in rotation by the electric motor, while said second clutch is kept in a slip condition so that a rotational speed of the electric motor is higher than a minimum rotational speed which allows operation of the internal combustion engine, and said slip condition of the second clutch is kept until the internal combustion engine and the electric motor rotate substantially at a same speed which is lower than the rotational speed of said input shaft before the gear shift, and which is progressively decreased to a value of rotational speed of said input shaft after the gear shift.

8. A hybrid propulsion system for a vehicle, including an in-series arrangement having an internal combustion engine, a first clutch, an electric motor, a second clutch, a third clutch and a gearbox having a first input shaft, a second input shaft and an output shaft connected to the drive wheels of the vehicle, wherein said first clutch is arranged between the internal combustion engine and the electric motor, said second clutch is arranged between the electric motor and said first input shaft of the gearbox, and said third clutch is arranged between the electric motor and said second input shaft of the gearbox, wherein said hybrid propulsion system comprises at least one electronic control unit configured for actuating the method of claim 1.

9. A vehicle comprising a hybrid propulsion system according to claim 8.

\* \* \* \* \*